US006426748B1

(12) United States Patent
Megahed (10) Patent No.: US 6,426,748 B1
(45) Date of Patent: Jul. 30, 2002

(54) METHOD AND APPARATUS FOR DATA COMPRESSION FOR THREE-DIMENSIONAL GRAPHICS (75) Inventor: Abe E. Megahed, Madison, WI (US)

(73) Assignee: Hypercosm, Inc., Middleton, WI (US)

( * ) Notice: Subject to any disclaimer, the term of this patent is extended or adjusted under 35 U.S.C. 154(b) by 0 days.

(21) Appl. No.: 09/494,004

(22) Filed: Jan. 28, 2000

Related U.S. Application Data (60) Provisional application No. 60/117,764, filed on Jan. 29, 1999.

(51) Int. Cl.[7] .............................................. G06F 15/00
(52) U.S. Cl. ....................................................... 345/419
(58) Field of Search ................................ 345/419, 424, 345/441, 629, 619, 630

(56) References Cited

U.S. PATENT DOCUMENTS

| | | | |
|---|---|---|---|
| 4,860,678 A | 8/1989 | Skogward | 112/445 |
| 5,247,651 A | 9/1993 | Clarisse | 395/500 |
| 5,522,082 A | 5/1996 | Guttag et al. | 395/800 |
| 5,596,767 A | 1/1997 | Guttag et al. | 395/800 |
| 5,717,840 A | 2/1998 | Pardo | 395/112 |
| 5,815,165 A | 9/1998 | Blixt | 345/506 |
| 6,275,236 B1 * | 8/2001 | Delahunty | 345/435 |
| 6,278,455 B1 * | 8/2001 | Baker | 345/473 |

* cited by examiner

*Primary Examiner*—Phu K. Nguyen
(74) *Attorney, Agent, or Firm*—Quarles & Brady LLP (57) ABSTRACT A method of transmitting or storing three-dimensional graphics in highly compressed form captures the model as a set of virtual machine instructions including shape primitives and parameters, shape operators and flow commands. Remote readers receiving the shape instruction file of these instructions generate the necessary polygons for the model representation at the local site. In this way, extremely compact model representation may be created that may be loaded to remote sites at high speed. Composite shapes may be defined of the shape parameters where the definitions including a mapping from composite shape parameters to constituent shape parameters allowing compressed definition of these composite shape parameters suitable for downloading or storage as well as ease of use resulting from the allowance of composite shape parameters.

18 Claims, 5 Drawing Sheets

METHOD AND APPARATUS FOR DATA COMPRESSION FOR THREE-DIMENSIONAL GRAPHICS

CROSS-REFERENCE TO RELATED APPLICATIONS

This application claims the benefit of U.S. provisional application 60/117,764 filed Jan. 29, 1999 hereby incorporated by reference.

BACKGROUND OF THE INVENTION

The present invention relates to a data compression method and apparatus and in particular to a loss-less data compression technique suitable for use in transmitting and storing interactive three-dimensional graphics such as may be transmitted over the Internet.

Three-dimensional graphics providing, for example, three-dimensionally defined surfaces that may be viewed from a variety of angles or manipulated in three dimensions can be extremely useful in conveying complex ideas.

Such models can be prepared on standard computer systems by assembling the model from a predefined library of standard three-dimensional "shape primitives" such as spheres, cones and cylinders manipulated by "shape operators" such as copying, scaling or rotation according to author commands entered in three-dimensional editor.

A polygon generator receives the model and based on input from a user indicating viewpoint or animation commands, produces a list of polygons having vertices defined in three dimensions. The polygons are selected according to well-known algorithms to fit together to approximate the surfaces of the model. The polygons may be read by a renderer producing a two-dimensional projection of the three-dimensional surface (an image) that can be displayed on a standard computer monitor and viewed by the user. Together the polygon generator and renderer provide an image player, which may be part of the editor.

The two-dimensional image may be stored in a variety of well-known image formats and be transmitted to other users for viewing. This latter approach, however, of transmitting the static image, destroys an advantage of three-dimensional model in that it may be manipulated to be viewed from varying angles to provide a greater understanding of the model's dimensions.

This problem may be avoided by sending repeated images to the remote user manipulating the model-based commands received from the user. This approach is not possible when the image is to be viewed on an off-line electronic book. Alternatively, the polygons themselves may be sent in a file to the user who is also supplied with a copy of the renderer so as to manipulate the model directly.

Both approaches are hampered by the significant time that it takes with current phone technology to transmit the underlying data.

BRIEF SUMMARY OF THE INVENTION

The present inventor has recognized that the processing of generating three-dimensional graphic of (1) designating a set of shaped primitives, (2) modifying the shape parameters of the shape primitives with shape operators, (3) in a series of defined steps so as to produce a polygon file, results in an effective expansion of data by many thousands to one. It follows that by truncating this process at the instruction level (e.g. shape primitives, shape operators and flow instructions), one can create an effective data compression of equal amount.

Accordingly, in the invention, a remote user is provided with only the high level instructions used by the polygon generator to produce the polygons and a "virtual machine" image player for processing those high level instructions. As a first matter, therefore, the present invention provides a loss-less, high ratio data compression technique for transmitting three-dimensional graphics to remote users rapidly for real-time interactivity at the user site.

The inventor has overcome what might be expected to be one limitation of such an approach, that of a limited and static set of shape primitives implicit in a system where the image player is distributed to a large number of users some having limited memory resources, by allowing composite shapes to be defined from the shape primitives. The composite shapes have their own specially defined shape parameters to be easily manipulated just like the shape primitives. The definitions of the composite shapes are by their nature are extremely compact and can be readily stored or transmitted remotely.

Specifically then, the present invention provides a system for simplifying the distribution of three-dimensional graphics. The apparatus includes an editor executable on a first electronic computer having a first graphics display and a first user input device, the editor accepting author commands from the first user input device to produce a shape instruction file. The shape instruction file is composed in turn of: (i) at least one shape primitive identifying a predefined three-dimensional shape having associated shape parameters, and (ii) at least one shape operator operating on the shape primitive according to an operation argument to change ones of the shape parameters associated with the shape primitive. The system further includes a distribution medium for distributing the shape instruction file to a user and an image player at the user's site executable on a second electronic computer having a second graphics display. The image player receives the shape instruction file via the distribution medium to generate on the second graphics display a two-dimensional representation of the three-dimensional graphic by modifying the shape parameters of the shape primitive according to the operation argument of the shape operator.

Thus it is one object of the invention to provide for an extremely compact transmission of three-dimensional graphic that allows full interactivity and manipulation at the user's end. By sending the high level instructions used to create the model, both a high degree of compression and complete interactivity are preserved.

It is another object of the invention to minimize the amount of writeable memory that is occupied by software needed to produce three-dimensional graphics. Because the image player deals with predefined shape primitives, shape operators and flow commands, it may be held in the second computer in read-only memory and the writeable memory saves the fairly compact shape instruction file and necessary image buffers. Writeable memory is generally more expensive and requires greater power consumption than read-only memory.

The editor may include a second image player reading the shape instruction file to generate on the first graphics display, a two-dimensional representation of the three-dimensional graphic by modifying the shape parameters of the shape primitives according to the operation argument of the shape operator.

Thus it is another object of the invention to reproduce the virtual machine producing three-dimensional graphics from high-level instructions for use both by the model programmers and model users.

The distribution medium may be the Internet and the image player may be a plugin to an Internet browser.

Thus it is another object of the invention to allow three-dimensional graphics to be transmitted easily over the Internet.

The shape primitives may include sphere, rectangular prisms, cones, cylinder and plane and the shape parameters may include location, rotation, dimension and color.

Thus it is another object of the invention to select shape primitives that can provide highly compressed forms of the shapes they represent. Thus, for example, a sphere shape primitive defined by a few bytes of data may produce thousands of bytes of polygon data in the resulting three-dimensional graphic.

The editor may further accept author commands to produce flow commands defining flow and execution of the shape operators operating on the shape primitives.

Thus it is another object of the invention to realize the compression inherent in flow commands such as looping and branching. For example, a single looping command may create an arbitrarily large number of shapes in the model.

The editor may further accept author commands from the first user input device to produce at least one composite shape associating multiple author-selected shape primitives, the composite shape having an associated composite shape parameter and including an author-defined mapping section relating the composite shape parameter to ones of the shape parameters associated with the shape primitives of the composite shape primitive. The shape instruction file may include at least one composite shape operator operating on the composite shape according to a composite operation argument to change ones of the shape parameters associated with the shape primitives of the composite shape according to the user defined mapping section.

Thus it is yet another object of the invention to provide great flexibility in creating new shape "primitives" that operate like standard shape primitives insofar as their capability of being arguments for shape operators. The composite shape primitives may be quickly transmitted as being functions of predefined shape primitives and yet may be manipulated by the model author as if they were predefined shape primitives compatible with high level shape operators.

The foregoing and other objects and advantages of the invention will appear from the following description. In the description, reference is made to the accompanying drawings, which form a part hereof, and in which there is shown by way of illustration, a preferred embodiment of the invention. Such embodiment does not necessary represent the full scope of the invention, however, and reference must be made to the claims herein for interpreting the scope of the invention.

DETAILED DESCRIPTION OF THE INVENTION

Figure 1:
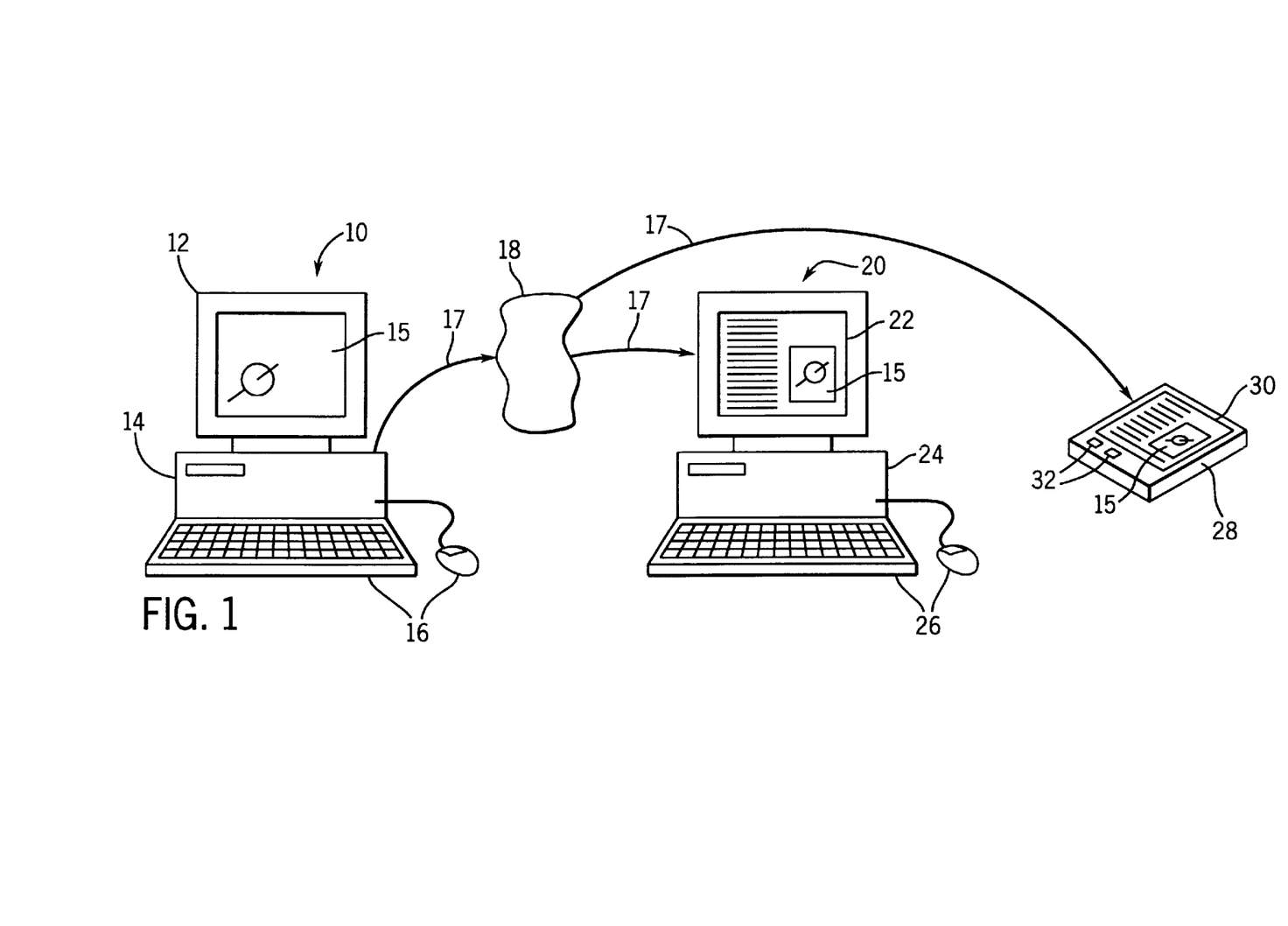
FIG. 1 is a simplified representation of a first computer, used for three-dimensional graphic creation, in communication with a second computer communicating with the first computer over the Internet or with a special purpose electronic book also communicating with the first computer.

Referring to FIG. 1, a work station comprising a standard desktop computer 10 having a display 12, processor unit 14 and author input devices 16 including a keyboard and a mouse, may be used to prepare a three-dimensional graphic as part of a World-Wide-Web page 15 or an electronic textbook. The three-dimensional graphic may be transmitted in a shape instruction file 17 via the distribution medium 18 of the Internet to be received by a second computer 20 similar to computer 10 and also having an electronic display 22, a processor 24 and user input devices 26, such as a keyboard and mouse well known in the art. The computer 20 may initiate the transfer of data from computer 10 following a typical browser-server protocol.

Alternatively the distribution medium may be a recorded disk or the Internet for transmittal to a dedicated electronic book reader 28 having a display 30 and limited cursor control inputs 32 of a type well known in the art.

Generally, each of computers 10, 20 and dedicated electronic book reader 28 provide a writeable memory frequently referred to as RAM and may include non-volatile read-only memory in the case of dedicated electronic book reader 28 or non-volatile disk based memory in the case of computers 10 and 20 containing an operating system and other fixed programs. Each computer 10, 20 and dedicated electronic book reader 28 also includes a processor for executing instructions contained within its memory, a display and input devices according to methods well understood in the art.

Figure 2:
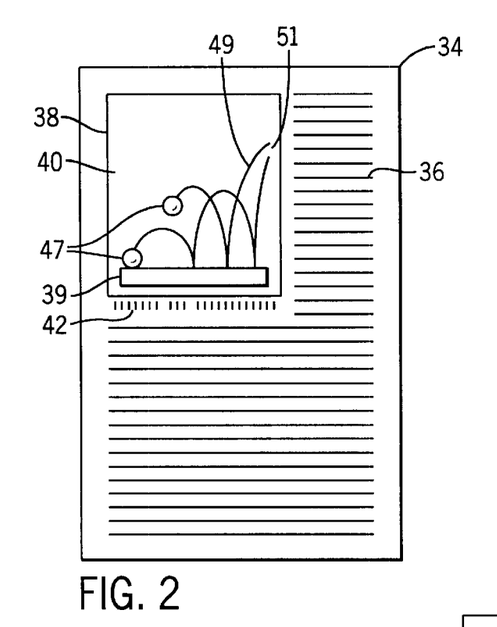
FIG. 2 is a simplified representation of the display of the second computer or electronic book of FIG. 1 showing an electronic book "page" having a text field and three-dimensional graphic.

Referring now to FIG. 2, the display 22 of computer 20 and 30 of dedicated electronic book reader 28 may depict a "page" 34 having text 36 wrapped around an image 40 depicting a projection of one or more three-dimensional graphics 38. Generally the text 36 may include descriptions of subject matter relating to the image 40 and may include hyperlinks between various other portions of the electronic book in a manner well understood in the art. Different pages 34 may be displayed or recalled with standardized user inputs through devices 26 or 32.

Image 40 of FIG. 2 provides an example of an image depicting the bouncing of two spheres 47 of different elasticity against a surface 39 to follow trajectories 49 that are plotted behind them. In this example, the elasticity coefficients of the spheres 47 are entered in the caption 42 by the user and the animation of the image initiated by arbitrary user command, via devices 26 or 32. The particular input by the user affects the resulting display of image 40 so that using conventional animation techniques, a different series of images would be required for each possible combination of different elasticities, an unworkable proposition with current computer hardware displaying prerecorded images. In the present invention, as will be described, the images are not transmitted but instead a shape instruction file 17 consisting of highly compact shape primitives, shape operators and flow commands forming the essential instruction set of a virtual three-dimensional graphicing machine.

Figure 3:
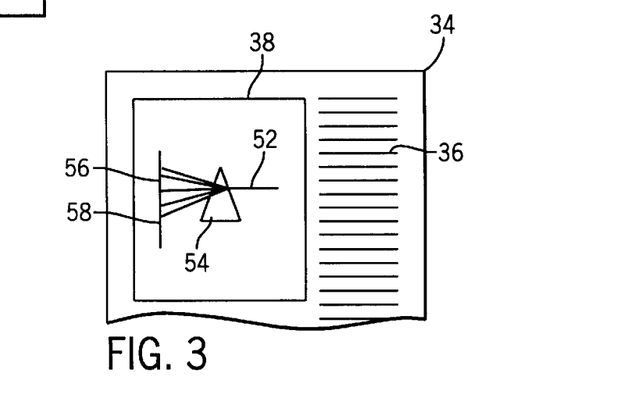
FIGS. 3 and 4 are fragmentary electronic book pages similar to that of FIG. 2 showing three-dimensional graphic having two arbitrary rotational orientations as selected by the user.
Figure 4:
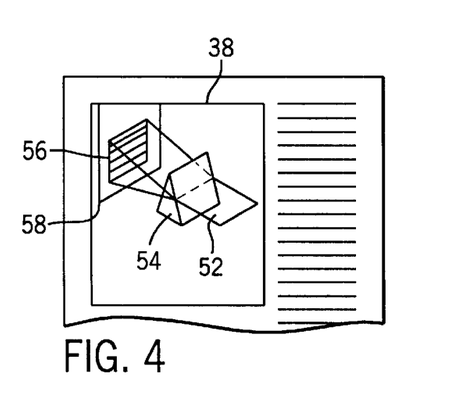

Referring now to FIG. 3, the figure 38 may alternatively show a rendition of the passage of a ray of light 52 through a prism 54 to project a spectrum 56 upon a screen 58 as depicted in a side elevational view in FIG. 3. Additional understanding of the figure 38 may be obtained by rotating the reference frame of the three-dimensional graphic 38 by user input to an arbitrary oblique view as shown in FIG. 4 allowing the projection of the spectrum to be viewed, for example, more nearly normal to the surface of the screen 58. Again, storing multiple images would require an unworkably large amount of storage to encompass all the possible variations provided by the three-dimensional graphic 38, or the equally cumbersome transmission of the large number of polygons of the three-dimensional graphics 38.

In the present invention, a large degree of interactivity in images requiring small data size is provided by capturing the concept of the image prior to its conversion to polygons or pixel values.

Figure 5:
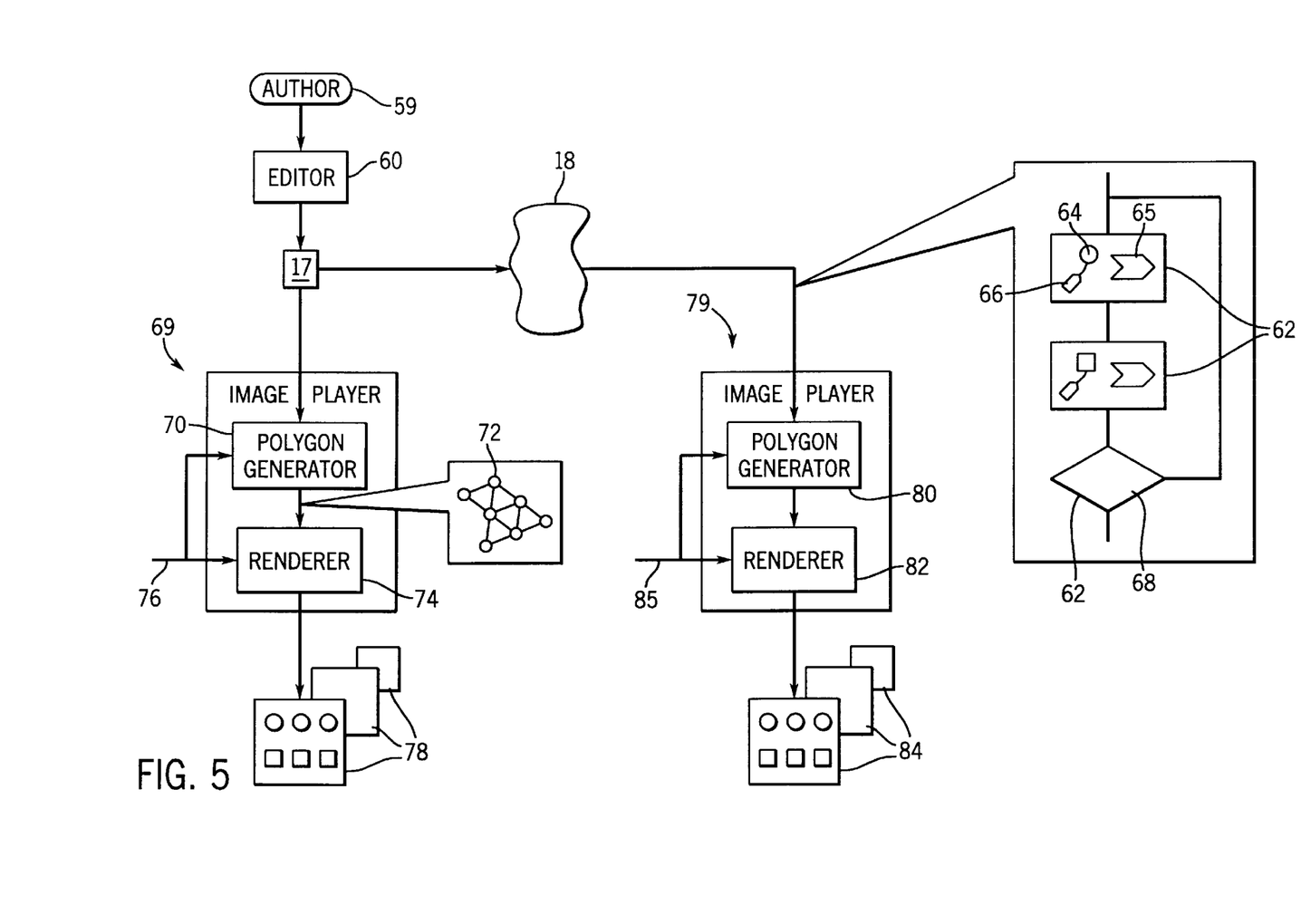
FIG. 5 is a block diagram showing the operation of the present invention in creating three-dimensional graphics from shape primitives, shape operators and flow commands and transmitting the figures in highly compressed form as a shape instruction file composed of shape primitives and flow commands.

Referring now to FIG. 5, the present invention includes an editor 60 receiving commands from an author 59 to define a shape instruction file 17 comprised of the shape declarations 62 including principally: shape primitives 64, their corresponding parameters 66, shape operators 65, and flow commands 68 each of which will be described in more detail below. The editor may be a conventional text editor of a type well known in the art, allowing generation of the shape instruction file 17 by entering text described in the graphics including the shape declarations 62 or may include a graphic user interface listing instructions in menu form as pictorial icons and allowing setting of numeric values via graphic controls or direct manipulation of shape icons on the display 12 (shown in FIG. 1).

The text shape declarations 62 include symbolic references that allow for easy editing. These text shape declarations 62 may be further processed to intermediary shape declarations that are either tokenized versions of the text (to reduce file size) or are modified instructions having their symbolic references removed. In this latter case, the instructions may be quickly executed without the need to resolve symbolic references speeding later image generation. Any of these forms of declarations may form the shape file 17.

The shape instruction file 17 is received by a polygon generator 70, which produces a set of polygons 72 having vertices defined in three dimensions, which tessellate one or more surfaces conforming to the desired surface of the three-dimensional graphics 38. Polygon generators 70 operating on shape primitives and their parameters are well known in the art. The polygon generator 70 of the present invention includes an interpreter for execution the shape operators 65 according to the flow commands 68 according to techniques known in the art of interpreted computer languages. Thus the polygon generator 70 acts like a virtual machine executing the shape instructions 62 as a language.

The polygon generator 70 may also receive inputs 76 providing numeric variables operated on by operators or flow commands as will be understood from the following description.

The set of polygons 72 is provided to a renderer 74 of a type well known in the art. The renderer 74 also receives inputs 76 from a user, for example defining viewpoint of the resulting two-dimensional rendered image, but possibly including other controls or variables that will be arguments for shape operators 65 or flow commands 68 of the shape instruction file 17. From the polygons 72 and the inputs 76, the renderer 74 produces one or more image files 78 depicting the three-dimensional graphic 38 as projected to a two-dimensional image at different angles or different times. The polygon generator 70 and the renderer 74 together form an image player 69.

As mentioned above, the shape instruction file 17 may be sent over the distribution medium 18 to a remote user. Actual text instructions may be sent or the instructions may be tokenized in compressed text or binary form for even more compaction.

The user is provided with a second image player 79 identical to the first image player 69 having a polygon generator 80 and a renderer 82 comparable to polygon generator 70 and renderer 74. The second image player 79 produces image files 84 of the three-dimensional graphics 38 of the shape instruction file 17 but possibly differing from image files 78 as a result of different inputs 85 to the renderer 74 such as viewpoint. Thus the user is free to manipulate the three-dimensional graphics 38 and this manipulation is accomplished locally without communication with the first image player 69. As before, the inputs 85 provided by the user may provide arguments operated on by shape operators 65 or flow commands 68 of the shape instruction file 17 allowing complex local interactions with the three-dimensional graphics 38.

Referring also to FIG. 1, the computer 20 and the dedicated electronic book reader 28 include the image player 79 and user inputs 85 and not the editor 60 thereby conserving memory space. Although the image player 79 incorporates the rules for interpreting the shape instruction file 17 as images will normally be larger than the shape instruction file 17, it will still be smaller than the data of the polygons 72 and also may be stored in lower cost and lower power consuming read-only memory. In this way, the present invention provides an advantage over a possible alternative using, for example, an "applet" generating languages such as Java in which a drawing program and data could be downloaded but necessarily into scarcer writeable memory. Programs like Java are of relatively low level, so the applet would necessarily be much larger than the shape instruction file 17 of the present invention and the creation of the applet would require a skilled programmer, whereas the system of the present invention can be readily adapted to easily used graphic type interfaces.

Each of the image players 69 and 79 provide in effect a virtual machine receiving the shape instructions 62 to create three-dimensional graphics 38. Because of the high degree of expansion from the description of the shape instruction 62 to the polygons 72 and ultimately to the image files 78 transmitting the shape instruction file 17 provides an effective high degree of compression avoiding the need for large memory capacity in the receiving device and high transmission speeds over the Internet.

Figure 6:
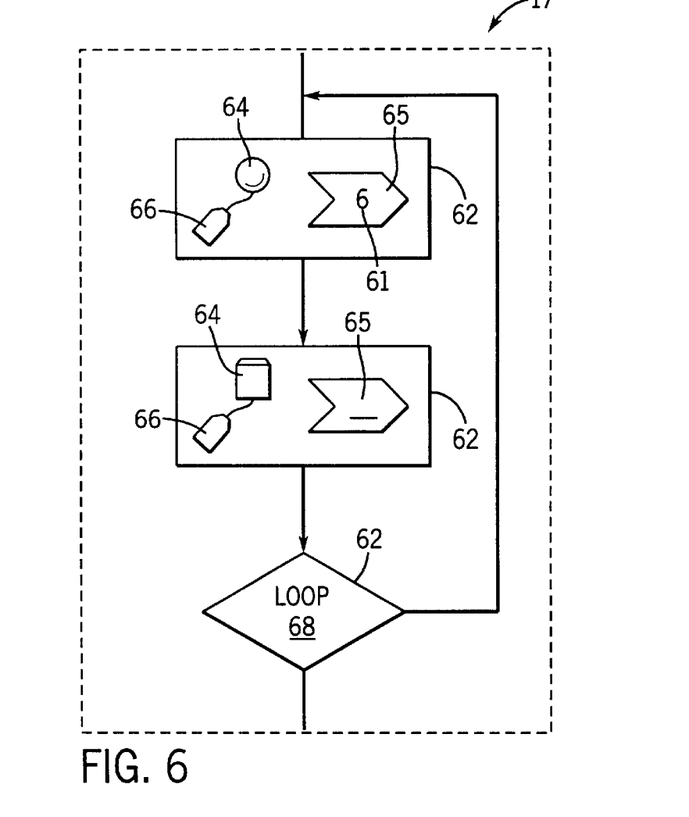
FIG. 6 is a detail view of the shape instruction file of FIG. 5 showing shape primitives, shape operators and flow commands for a simple three-dimensional graphic.

Referring now to FIG. 6, the shape instructions 62 of the shape instruction file 17 are analogous to, and in some cases equivalent to conventional computer instructions and thus can be executed using developed interpreter or compiler techniques. The shape primitives 17 and their parameters are like computer data, and supplement standard arithmetic and logical variables and constants that may also be part of the shape instruction file 17. Shape operators 65 operate on the shape primitives 17, thus supplementing standard arithmetic and logical operation operating on numeric and Boolean data. Flow commands are identical to similar flow commands such as branch, jump and loop commands that control the execution order in conventional computer languages.

Accordingly, the polygon generator 70 may simply execute the shape instructions 62 in sequence according to the flow command 68 operating on the shape primitive 64 and their parameter 66 according to the predefined operation of the shape operators 65 and arguments 61.

The shape primitives 17 may include sphere, rectangular parallelepiped (block), cylinder, cone and plane, but is not limited to these particular shapes or the parameters described. The creation of shape primitives and their parameters are generally known in the art for use in three-dimensional graphicing programs.

The shape operators 65 may include instancing (creating a copy of the shape) scaling (changing the shape's size), translation (changing the shape's location) and other well known shape manipulation functions. The shape operators 65 accept as arguments a shape primitive 64 and possibly numeric values indicating a transformation amount. The shape operators 65 may provide instructions to the polygon generator 70 to create a new shape (thus modifying an implicit existence parameter of the shape primitive 64) or may adjust explicit parameters of a shape as operated on by the polygon generator 70. This latter feature allows the generation of special shape operators by the author for new shapes as will be described.

Figure 7:
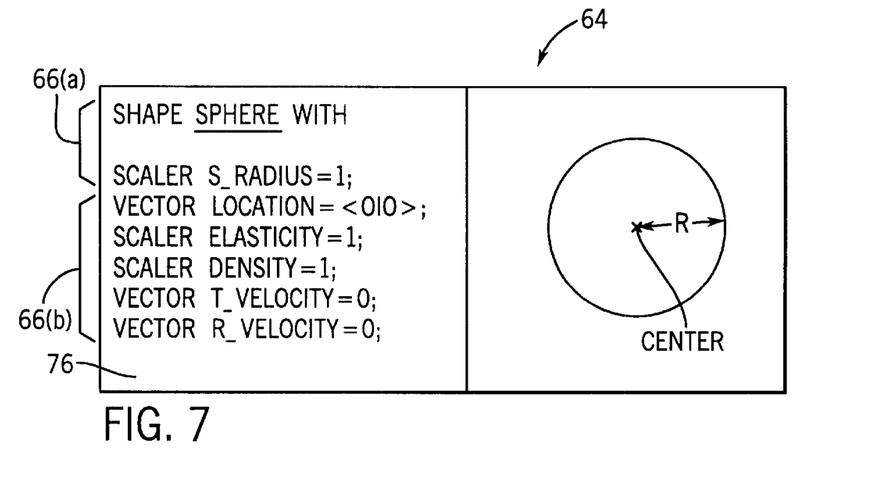
FIG. 7 is an example shape primitive used by the present invention.

Referring now to FIG. 7, an example shape instruction 62 termed "shape . . . with" provides for the instancing or generation of an argument shape primitive 64 in this case "sphere". The "shape . . . with" operations also accepts a set of numeric arguments for changing of the default values of the shape primitive 64, this part of the shape operator shown by an equal sign acting as an assignment operator following the name of the parameter.

For the sphere shape primitive 64, the shape parameters 66 include shape specific parameters 66a and global parameter 66b. The shape specific parameter 66a includes, for example, spherical radius, a dimension peculiar to a sphere. The global parameter 66b includes the shape's location, a vector indicating the shape of the shape center, and possibly elasticity, density, initial velocity in translation and initial velocity in rotation. These latter global parameters 66b are common to many physical objects. Other shape parameters 66 such as color and texture mapping (not shown) may also be provided. Shape parameters 66 not set at the time of instancing are given a default value. The shape parameters affect the algorithms for generating the polygons by the polygon generator 70 according to techniques well known in the art.

Referring again to FIG. 6, an example shape instruction 62a of shape instruction file 17 thus provides a shape operator 65 having as an argument a shape primitive 64 and its parameters 66 and possibly having one or more numeric arguments 61. When interpreted by the polygon generator 70, the shape operator 65 of the shape instruction 62 modifies the parameters 66 of the shape primitive 64 to produce polygons 72 (shown in FIG. 5).

Generally shapes may be operated on by multiple shape operators. Shape operators may be supplemented by standard arithmetic and logical instructions found in conventional computers.

The flow commands 68 are those directing the execution order of the shape instructions 62 per conventional computer techniques. The flow commands 68 thus mirror computer flow commands including, for example, FOR-NEXT loops, WHILE loops and REPEAT loops as well as TEST BRANCH and TEST JUMP statements in which branches or jumps are contingent on testing of a variable or the like. General arithmetic and logical operations and numeric Boolean and text data may also be included in the shape instructions 62.

Referring now to the following Table I, and FIG. 5, an example shape instruction file 17 may begin with the flow control instruction "for i:=1 to 3" familiar to those of ordinary skill in the art as defining a loop that will occur three times.

TABLE I

```
for i:=1 to 3
    begin
        shape sphere with
            location (i,2,7)
        end
        shape block with
            location(i,5,7)
        end
    end
end
```

Within that loop is the shape operator "shape . . . with" which takes as its argument the shape primitive "sphere" and provides an instancing or first copy of the sphere primitive. The sphere primitive invokes a predefined sphere algorithm written in a conventional computer language that can create a set of polygons representing a sphere according to its parameters. The sphere primitive invokes code that is stored in the polygon generator 70 and need not be transmitted over the Internet to other readers or stored in volatile memory.

This instruction "shape . . . with" is followed by a second shape operator 65 "location ( )" which because of its nested relationship in the syntax of the preferred embodiment takes as its argument the previous sphere shape primitive 64 and modifies its location of its center point by the arguments (i, 2, 7) defining a location in Cartesian three-space, one of which arguments is the variable i. The x-axis location i is equal to the index variable for the loop, thus as the loop proceeds, three spheres will be created each having a different x location as shown generally in image files 78 of FIG. 5. These shape operators 65 are followed by two additional shape operators ("shape block with" instancing a block shape primitive) and location (i, 5, 7) modifying the location parameters of that instanced block.

As can be seen from Table I, the representation of the image of many hundreds of polygons is extremely compact.

As mentioned above, parameters that are not specified assume default values further reducing the amount of data that need be transmitted to create three-dimensional-dimensional model 38. Further, each of the commands may be tokenized to a smaller data size so that the actual ASCII text depicted in Table I need not be transmitted.

While the use of shape primitives creates an extremely compact shape instruction file 17, there can be instances where it is desirable to use more complex shape primitives. This may be accomplished by downloading new shape primitives to each polygon generator 80 but this takes additional transmission and storage time. Alternatively new shape primitives can be introduced from time to time at the risk of obsolescing other image players 79 that are already in place.

The present invention avoids these problems by allowing definition of composite shapes formed of shape primitives 64 that have been previously defined and having the ability to assume composite shape parameters so that they can be manipulated like a conventional shape primitive 64 drastically simplifying the editing process and providing concomitant reduction in the data that needs to be transmitted over the transmission medium 18.

Figure 8:
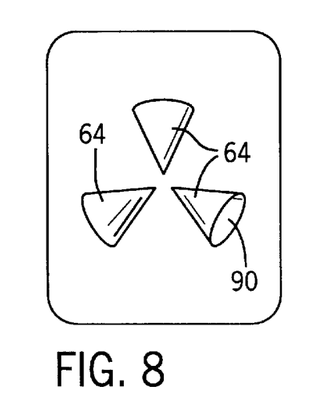
FIG. 8 is an example of a composite shape constructed of shape primitives and having a first value of a composite shape parameter mapped to shape parameters of the underlying constituent shape primitives.

Referring now to Table II, the present invention allows a composite shape to be defined, in this case a flower as shown in FIG. 8 as element 90. The flower will be composed of three shape primitives 64 of a type cone.

TABLE II

```
define shape flower
    integer:petal_number
    for i:=1 to petal_number
        cone with
        rotate by 360/petal_number
        end
    end
end
```

Referring to Table II, the definition of a composite shape includes a user defined mapping section-relating parameters for the composite shape to the shape parameters of the constituent shape primitives 64. In this way once defined, the composite shape can be operated on exactly like a shape primitive 64 and specialized shape operators 65 may be defined possibly unique to the composite shape as will be shown.

Figure 9:
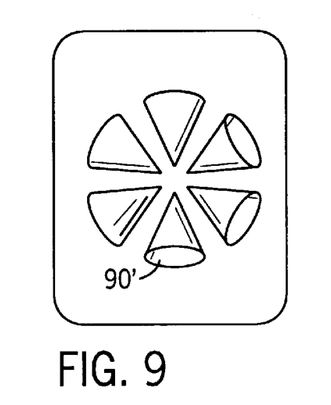
FIG. 9 is a figure similar to FIG. 8, having a second value of the composite shape primitive.

In this example, a composite shape parameter "petal_number" is defined. A mapping section of the definition of "flower" maps the "petal_number" composite shape primitive to the existence of a number of cones using the instructions following "for i:=1 to petal_number". Flow commands are used to instance a number of cones with different rotations (using the "rotate by" shape operator 65) corresponding to the petal_number. Thus if the petal_number is three, a composite shape 90 as shown in FIG. 8 is produced whereas with petal_number 6, the composite shape 90 of FIG. 9 is used. The individual parameters of the cone's shape primitives 64 may be invisible as a result of this definition.

Referring now to Table III, a function called "petals" may be simply defined for operation on an arguments of a shape primitive of flower, and of an integer variable i. The integer argument changes the petal_number parameter of the argument flower.

TABLE III

```
define operation petals (shape: flower; i:integer);
    shape.petal_number:=i
```

As can be seen from Tables II and III, the definition of the flower shape and of the operation are extremely compact and can be rapidly downloaded or simply stored at the receiving image player.

In dealing with shape primitives and composite shapes, the image player 79 reviews each shape instruction 62 in sequential fashion like an interpreter against a list of predefined shape primitives held in the possibly non-volatile memory of the image player 79. If the shape operator 65 and shape primitive 64 are found there, polygons 72 are generated according to techniques well known in the art for three-dimensional rendering. If the shape primitive 64 or shape operator 65 are not found, the image player 79 reviews those composite shape definitions and operations attached to the shape instruction file 17 as was transmitted and applies the instructions so contained. It will be understood that a composite shape, for example the flower, may be given many instances, shapes, sizes and parameters with only a single definition being transmitted.

As mentioned, each shape primitive 64 includes a number of parameters 66 providing greater flexibility in the depiction of shape described by the shape primitive 64. The parameters 66 may include, for example, a location of the shape in a Cartesian three space, the shape's defining dimensions, and the shape's color and texture. To these visual parameters, a second embodiment of the present invention adds "physical" parameters including, for example, elasticity, density, magnetic attraction, viscous-dampening, orbital or sliding constraints, viscous dampening and the like. These physical parameters, which need not necessarily correspond to real-world physical qualities, define how the shape interacts with its environment and other shapes. These shape primitives 64 and shape parameters 66 provide instructions to the renderer 82 as to how to change the images 84 over time.

Normally the shape primitives 64 will be associated with only the minimum parameters 66 necessary to define the shape, such as those describing the dimension of the shape. This allows the shape primitive 64 to be "closed ended" having a limited and fixed set of parameters. Additional parameters such as the physical parameters described above are then associated with the shape primitive 64 through the mechanism of inheritance well known in the object oriented language art. In this way, for example, one may define a "physical sphere" inheriting all the properties of the sphere primitive and adding the parameters of density and elasticity.

For the image of FIGS. 3 and 4, the image player 79 receives a user input 85 that may effect a rotation of the viewpoint via control of the renderer 82 according to well known techniques. With the image of FIG. 2, user input 76 provided to the renderer can be values indicating a desired elasticity and velocity and an initiation signal to the renderer 74 imparting an initial velocity to the sphere 47 from initial position 51. Calculation of the trajectories uses well known modeling techniques and avoids the need for data intensive descriptions of trajectories and the like. Further, the development of the images is simplified as the author need only describe a relatively few parameters.

Such shape primitives 64 as noted are very common in higher-level language three-dimensional rendering drafting tools. However, the physical parameters such as elasticity, density, and velocity are normally not provided and more painstaking animation must therefore be undertaken. By defining such physical parameters, the same benefits that are provided by shape parameters, that of allowing complex shapes to be more easily created by a few higher-level commands, are provided to the animation of the figures. For example, by defining elasticity and velocities, a wide variety of different physical behavior may be easily modeled without the transmission or precalculation of complex trajectories. The models of the physics of motion are built into the image player 79 and are relatively simply described by a few equations well known in the art.

Figure 10:
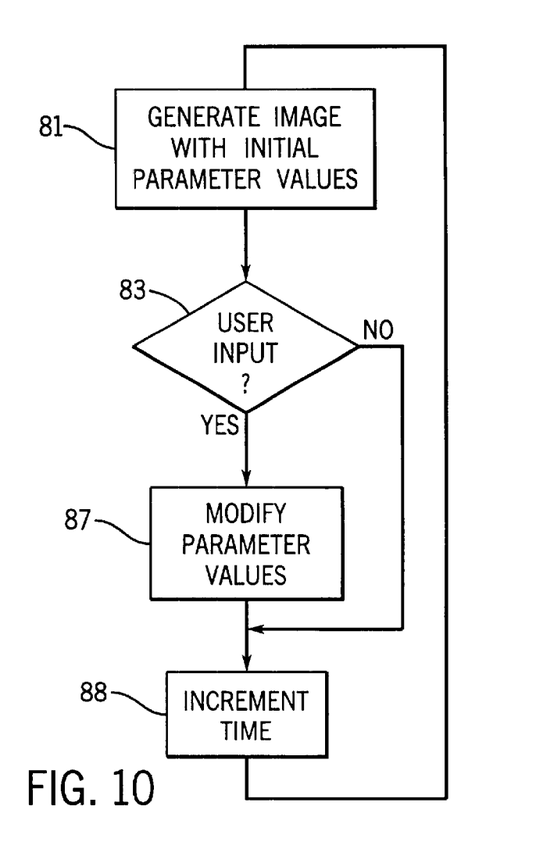
FIG. 10 is a flow chart of the steps executed by an example shape instruction file that may be transmitted to an electronic book.

Referring now to FIG. 10, the execution of an example shape instruction file 17 in the image player 79 begins at an initial step 81 where an image is created using initial parameter values defined by the shape instruction file 17. At decision block 83, user input is sought, and if there is no user input, an internal time value is incremented at process block 88 and the program returns to generate a possibly revised image at process block 81 using the initial parameter values as modified by the time increment, if at all. Generally, shape of shape primitives 64 will be modified over time if they have initial velocities.

If a user input is received, then the execution proceeds to process block 87 and the parameters 66 are modified according to the flow commands 68 describing a reaction to the user inputs, for example, by imparting a velocity to a shape in the case of the example figure of FIG. 2. The modification of the parameter values may be in accordance with the flow commands and also in accordance with the parameter values themselves and the parameter values of other shape primitives 64.

At process block 88, time is incremented and the execution returns to process block 81.

The above description has been that of a preferred embodiment of the present invention. It will occur to those that practice the art that many modifications may be made without departing from the spirit and scope of the invention. For example, the present invention may find use as a plug-in for a browser or the like receiving information over the Internet. Although textbooks are described, it will be understood that the same techniques may be used for other combined text and figure publications. In order to apprise the public of the various embodiments that may fall within the scope of the invention, the following claims are made.

I claim:

1. An apparatus for distributing three-dimensional graphics comprising:
    (a) an editor executable on a first electronic computer having a first graphics display and a first user input device, the editor accepting user commands from the first user input device to produce a shape instruction file composed of:
        (i) at least one shape primitive identifying a predefined three-dimensional shape having associated shape parameters,
        (ii) at least one shape operator operating on the shape primitive according to an operation argument to change ones of the shape parameters associated with the shape primitive;
    (b) a distribution medium distributing the shape instruction file to a user;
    (c) an image player executable on a second electronic computer having a second graphics display, the image player receiving the shape instruction file via the distribution medium to generate on the second graphics display a two-dimensional representation of the three-dimensional graphic by modifying the shape parameters of the shape primitive according to the operation argument of the shape operator;
    whereby three-dimensional graphics can be distributed in highly compressed form.

2. The apparatus of claim 1 wherein the editor further includes a second image player reading the shape instruction file to generate on the first graphics display the two-dimensional representation of the three-dimensional graphic by modifying the shape parameters of the shape primitive according to the operation argument of the shape operator; whereby the editor allows for viewing of the three-dimensional graphic during an editing process.

3. The apparatus of claim 1 wherein the distribution medium is the Internet and wherein the image player is a plug-in to an Internet browser.

4. The apparatus of claim 1 wherein the shape primitives are selected from the group consisting of: sphere, rectangular prism, cone, cylinder and plane.

5. The apparatus of claim 1 wherein the shape parameters are selected from the group consisting of: location, rotation, dimension, and color.

6. The apparatus of claim 1 wherein the shape operators are selected from the group consisting of: instance, stretch, translate and rotate.

7. The apparatus of claim 1 wherein the editor further accepts user commands from the first user input device to produce a shape instruction file including:
    (iii) flow commands defining flow in execution of the shape operator operating on the shape primitive; and
    wherein the image player generates on the second graphics display a two-dimensional representation of the three-dimensional graphic by modifying the shape parameters of the shape primitive according to the operation argument of the shape operator according an execution flow defined by the flow commands.

8. The apparatus of claim 7 wherein the flow commands are selected from the group consisting of branch instructions and loop instructions.

9. The apparatus of claim 1 wherein the editor further accepts user commands from the first user input device to produce a shape instruction file including:
    (iii) at least one composite shape associating multiple author-selected shape primitives identifying ones of the predefined three-dimensional shapes having associated shape parameters, the composite shape having an associated composite shape parameter and including an author-defined mapping section relating the composite shape parameter to ones of the shape parameters associated with the shape primitives of the composite shape primitive,
    (iv) at least one composite shape operator operating on the composite shape according to a composite operation argument to change ones of the shape parameters associated with the shape primitives of the composite shape according to the user defined mapping section; and
    wherein the image player also generates on the second graphics display a two-dimensional representation of the three-dimensional graphic by modifying the composite shape according to the composite operation argument as mapped to the ones of the shape primitives of the composite shape primitive.

10. A method for distributing three-dimensional graphics comprising:
    (a) operating an editor executable on a first electronic computer having a first graphics display and a first user input device, to receive user commands from the first user input device to produce a shape instruction file composed of:
        (i) at least one shape primitive identifying a predefined three-dimensional shape having associated shape parameters,
        (ii) at least one shape operator operating on the shape primitive according to an operation argument to change ones of the shape parameters associated with the shape primitive;
    (b) distributing the shape instruction file to a user via a distribution medium;

(c) receiving the shape instruction file from the distribution medium at a remote image player executable on a second electronic computer having a second graphics display to generate on the second graphics display a two-dimensional representation of the three-dimensional graphic by modifying the shape parameters of the shape primitive according to the operation argument of the shape operator.

11. The method of claim 10 wherein the editor includes a second image player and including the step of reading the shape instruction file with the second image player to generate on the first graphics display the two-dimensional representation of the three-dimensional graphic by modifying the shape parameters of the shape primitive according to the operation argument of the shape operator.

12. The method of claim 10 wherein the distribution medium is the Internet and wherein the image player is a plug-in to an Internet browser.

13. The method of claim 10 wherein the shape primitives are selected from the group consisting of: sphere, rectangular prism, cone, cylinder and plane.

14. The method of claim 10 wherein the shape parameters are selected from the group consisting of: location, rotation, dimension, and color.

15. The method of claim 10 wherein the shape operators are selected from the group consisting of: instance, stretch, translate and rotate.

16. The method of claim 10 further including the step of:

accepting at the editor user commands from the first user input device to produce a shape instruction file including: flow commands defining flow in execution of the shape operator operating on the shape primitive;

wherein the image player generates on the second graphics display a two-dimensional representation of the three-dimensional graphic by modifying the shape parameters of the shape primitive according to the operation argument of the shape operator according to an execution flow defined by the flow commands.

17. The method of claim 16 wherein the flow commands are selected from the group consisting of branch instructions and loop instructions.

18. The method of claim 10 further including the step of:

accepting at the editor accepts user commands from the first user input device to produce a shape instruction file including:

(iii) at least one composite shape associating multiple author-selected shape primitives identifying ones of the predefined three-dimensional shapes having associated shape parameters, the composite shape having an associated composite shape parameter and including an author-defined mapping section relating the composite shape parameter to ones of the shape parameters associated with the shape primitives of the composite shape primitive, (iv) at least one composite shape operator operating on the composite shape according to a composite operation argument to change ones of the shape parameters associated with the shape primitives of the composite shape according to the user defined mapping section;

wherein the image player also generates on the second graphics display a two-dimensional representation of the three-dimensional graphic by modifying the composite shape according to the composite operation argument as mapped to the ones of the shape primitives of the composite shape primitive.

* * * * *